July 15, 1947.  A. J. ODGARD  2,423,899
BAIT-MOUNTING NEEDLE
Filed July 5, 1945
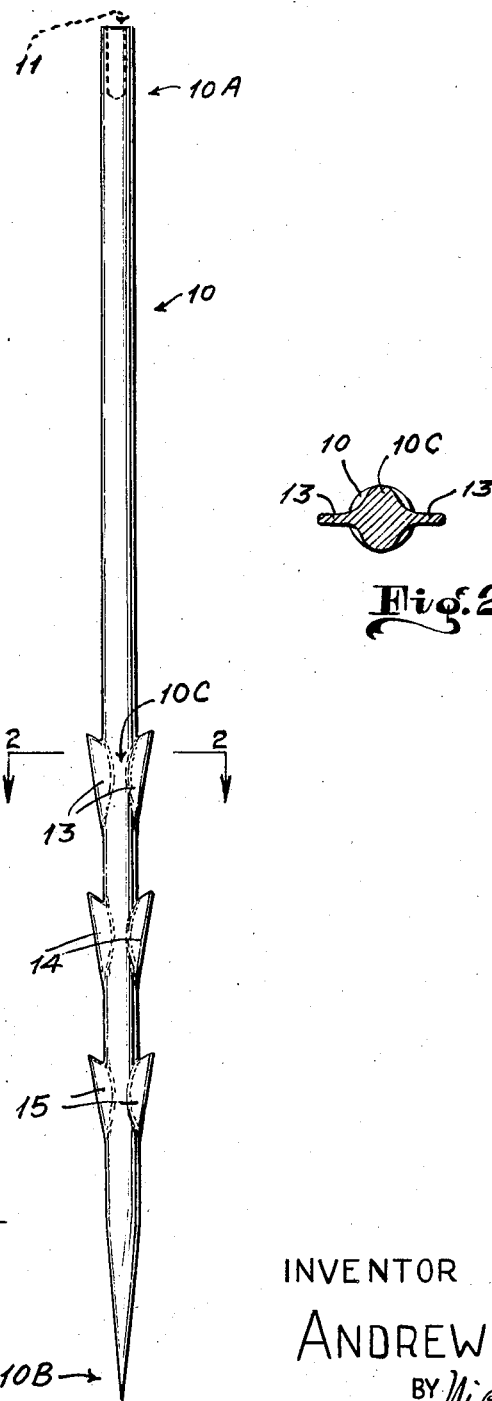
INVENTOR
ANDREW J. ODGARD
BY Nicholas Rippen
AGENT Patented July 15, 1947

2,423,899

UNITED STATES PATENT OFFICE 2,423,899

BAIT-MOUNTING NEEDLE

Andrew J. Odgard, Glendale, Calif.

Application July 5, 1945, Serial No. 603,387

3 Claims. (Cl. 43—4)

My invention relates to special means for mounting live bait, as for example and especially, a worm, onto the fish hook.

In the absence of such special means, fishermen or sportsmen, when having need to bait a fish hook with a worm, all too often experience difficulty when attempting to pierce and then transfer the worm to the fish hook in a manner whereby a longitudinally axially substantially symmetrical disposition of the worm about the hook is obtained. When it is not, the point of the hook will often break through to the exterior of the worm at some place intermediate of the ends, carrying with it a part of the entrails, the worm often extending transversely away from the hook, the metal of the hook visible to the prospective victim and adapted to induce wariness in him, the said transversely extended portion of the worm lending itself to ready seizing thereof and detachment of the worm from the hook without also hooking the fish.

It is therefore an object and advantage of the instant invention to provide for the definite disposition of the entire body of the worm longitudinally thereof to conceal and completely sheath it and to effect the definite retention of the entire worm by the hook.

There are a number of embodiments of the invention, all embodying the principles thereof, that can and will readily suggest themselves to persons skilled in the art. However, because one thereof is typical and simple and therefore lends itself to plain exposition of said principles, I have selected it as the subject for description in this specification and for illustration in the accompanying drawing, in which—

Figure 1 is an external view of a bait-mounting needle constituting said embodiment.

Figure 2 is a transverse-sectional view thereof as seen in the plane 2—2 in Figure 1.

The needle consists of an attenuated object of metal or otherwise, 10, provided with a pointed worm-piercing end 10B and with a thereto opposed, hollow worm-transferring end 10A, adapted because of its tubular nature to receive the point of a fish hook. Intermediate of the two said ends, but disposed nearer the pointed end, are the three pairs of barbs, 13, 14 and 15, the two barbs in each said par being mutually transversely opposed. Since it would be most practical to manufacture the needles from round wire by hot- or cold-pressing the barbs out of the round-sectional material, there is a flow of the metal between each two barbs to constitute them, whereby the section of the needle is reduced thereat, namely, 10C, as can be seen in Figure 1 and especially in Figure 2.

Instead of the three pairs of barbs shown, whose function is to restrain the live worm from backing off from the needle previously to transfer thereof onto the fish hook, there may be only two pairs or a single pair or more pairs. Also, instead of pairs, the barbs may be disposed singly. Also, a needle without any barbs at all will function reasonably satisfactorily.

After mounting the worm on the needle, the point of a fish hook is inserted into the tubular opening 11 and, while the needle and the hook are retained in such relationship, the worm is slid off from the needle and onto the hook for definite and final retention of the worm thereon.

Instead of solid wire as raw material for manufacturing, an entirely hollow needle may be rolled from thin sheet metal, a single or a number of single barbs having been previously stamped out of the longitudinal-marginal areas of the sheet. This construction is so familiar a one in connection with other devices that it is not believed necessary to include additional views thereof.

I claim:

1. A bait mounting needle having a pointed bait receiving end and a thereto opposed tubular worm transferring end adapted to receive the point of a fish hook.

2. A bait mounting needle having a pointed bait receiving end provided with at least one barb and a thereto opposed tubular worm transferring end adapted to receive the point of a fish hook.

3. A bait mounting needle having a pointed bait receiving end provided with at least one pair of mutually transversely opposed barbs and a thereto opposed tubular worm transferring end adapted to receive the point of a fish hook.

ANDREW J. ODGARD.

REFERENCES CITED

The following references are of record in the file of this patent:

UNITED STATES PATENTS

| Number | Name | Date |
|---|---|---|
| 1,055,104 | Van Norsdall | Mar. 4, 1913 |
| 867,044 | Huss | Sept. 25, 1907 |